Feb. 10, 1948. J. M. SAWHILL ET AL 2,435,800
AUTOMATIC WELDING ELECTRODES
Filed Jan. 22, 1946
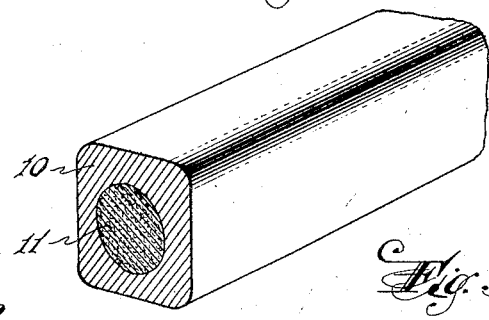
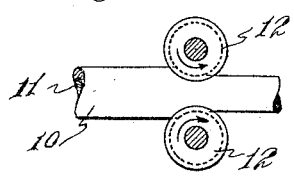
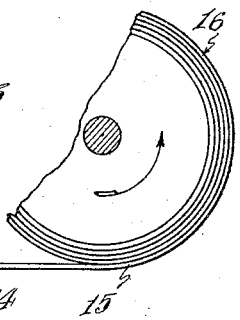
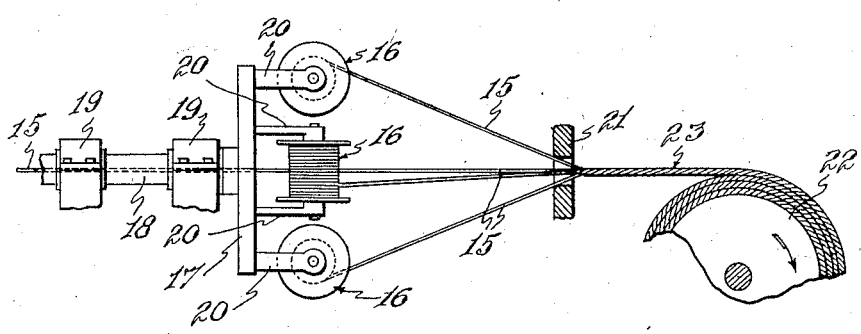
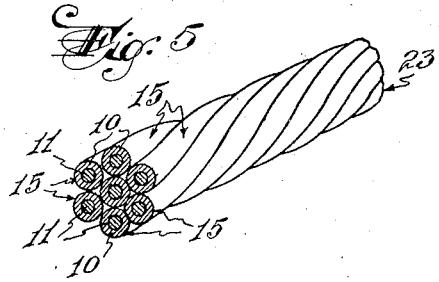
Inventor:
JAMES M. SAWHILL AND
By JAMES E. SKINNER,
Harry B. Rook, Attorney.

Patented Feb. 10, 1948

2,435,800

UNITED STATES PATENT OFFICE 2,435,800

AUTOMATIC WELDING ELECTRODE

James M. Sawhill, Towson, and James E. Skinner, Dundalk, Md., assignors to The Reid-Avery Company, Dundalk, Md., a corporation of Maryland Application January 22, 1946, Serial No. 642,662

5 Claims. (Cl. 219—8)

The present invention relates to automatic welding electrodes in the form of a cable produced by stranding a plurality of flux-filled wires.

The favorable and unfavorable factors relating to the construction of automatic welding electrodes and the mechanical feeding thereof while maintaining adequate electrical connection are well known to those working in this field. Various proposals have been made for ensuring good fluxing and arc-shielding characteristics without unduly sacrificing high electrical efficiency. While such prior proposals have represented significant advances we have felt that they still left much to be desired.

It is, accordingly, an object of our present invention to produce an automatic welding electrode which has new and useful properties and characteristics not shared by electrodes hitherto known to us.

Another object of the invention resides in producing an automatic welding electrode in the form of a cable made by stranding a plurality of flux-filled wires on a cable stranding machine.

A further object of the invention comprises a cable-type electrode having a plurality of helically disposed wires in stranded arrangement, each wire having a core of flux.

Other and further objects and advantages will be understood by those skilled in this art or will be apparent or pointed out hereinafter.

In the accompanying drawing:

Figure 1 is a perspective view of a composite ingot having a central flux core;

Figure 2 is a schematic view illustrating how the composite ingot of Figure 1 is reduced in cross-sectional area;

Figure 3 is a schematic view illustrating how the reduced ingot is drawn to wire dimensions;

Figure 4 diagrammatically illustrates the stranding of two or more wires resulting from the drawing operation of Figure 3 to form the finished cable of Figure 5 which illustrates a length of electrode having a plurality of helically disposed wires each of which has a core or flux.

In producing our new electrode we form a composite ingot made up of a suitable metallic material 10 and a central core 11 of any desired flux material of known chemical composition. The composite ingot of Figure 1 is preferably produced by casting the metallic material around a core of flux located centrally of the ingot mold in which the same is cast. Alternatively, a solid cast ingot may be cored out and flux inserted in the central ingot hole thus formed. The details of the production of the composite ingot do not per se form a part of or a limitation upon our present invention.

However produced, the composite ingot is welded or swaged at each end to prevent loss of flux and is then subjected to reduction of area in a suitable rolling mill represented by the driven rolls 12 of Figure 2 which form part of a standard mill. Reduction may be and usually is carried out in a plurality of stages in known manner with or without intermediate anneals until the required total reduction has been effected. Such reductions are, of course, accompanied by proportional elongation of both the metal shell and the flux core of the ingot so that the rolled product is relatively long and thin as compared with the initial ingot. In practice we reduce the ingot to a size which is suitable for wire-drawing. Such is indicated at 13 in Figure 3 in which the numeral 14 designates the die through which drawing takes place. The drawn wire 15 is usually wound to form a coil for convenience in handling, as shown at 16.

The next step is to wrap two or more wires 15 into a continuous cable on a standard cable stranding machine diagrammatically delineated in Figure 4. This machine includes a disc support 17 driven by a shaft 18 mounted in bearings 19. Support 17 is provided with a plurality of bracket mountings 20 each of which carries a coil of wire 16 in revolvable condition. Each wire leads through an aperture in stationary plate 21 and is wound on driven reel 22, support 17 rotating at a suitable speed.

In this manner the cable 23 is formed continuously and is subsequently cut into appropriate lengths by a shear. As seen best in Figure 5, the cable is composed of a plurality (two or more) of wires 15 arranged as helices. Each wire is composed of a tubular metallic shell and a core of flux 11. The flux is tightly compressed in place due to the pressure exerted thereon by the reducing and drawing operations. The cable is consequently characterized by excellent fluxing and arc shielding properties and by unusually extensive metallic surfaces providing good electrical contact coupled with good ability to be fed mechanically in an automatic machine. The cross section of the cable has a symmetrical arrangement of metal and flux and a highly desirable metal-flux ratio. The cable is, moreover, electrically substantially as efficient as a plain metallic electrode without the disadvantages of such plain electrode with respect to fluxing of the welds produced therewith. The use of our new cable-type electrode therefore makes it possible to produce clean, sound welds of highest quality.

It will be understood that the foregoing is presented as illustrative and not as limitative and that various modifications may be resorted to without departing from the scope or principles hereof. The invention is rather that set forth in the subjoined claims.

We claim:

1. An electrode in the form of a stranded cable having a plurality of wires disposed as helices, each wire having a core of flux.

2. An electrode comprising a plurality of tubular metallic wire shells laid together, each of which has a core of flux disposed therein.

3. An electrode for arc welding comprising a plurality of metallic wires helically twisted together into a stranded cable, each said wire having a central longitudinal core of flux.

4. A method of making an electrode for arc welding which comprises forming a metallic ingot with a central longitudinal hole filled with flux, closing the ends of said hole, reducing the ingot to a size suitable for wire-drawing, drawing it into wire, and helically twisting together a plurality of lengths of such wire to form a stranded cable.

5. A method of making an electrode for arc welding which comprises producing a seamless tubular metallic shell filled with a core of flux, and twisting a plurality of such shells to form a stranded cable.

JAMES M. SAWHILL.
JAMES E. SKINNER.

REFERENCES CITED

The following references are of record in the file of this patent:

UNITED STATES PATENTS

| Number | Name | Date |
|---|---|---|
| 1,361,269 | Mattice | Dec. 7, 1920 |
| 1,531,828 | Armor | Mar. 31, 1925 |
| 2,060,441 | Ross | Nov. 10, 1936 |
| 2,345,758 | Lincoln et al. | Apr. 4, 1944 |